(12) United States Patent
Hwang et al.

(10) Patent No.: US 9,763,241 B2
(45) Date of Patent: Sep. 12, 2017

(54) METHOD FOR RECEIVING CONTROL INFORMATION ON EPDCCH

(71) Applicant: LG ELECTRONICS INC., Seoul (KR)

(72) Inventors: Daesung Hwang, Seoul (KR); Joonkui Ahn, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 14/772,171

(22) PCT Filed: Feb. 27, 2014

(86) PCT No.: PCT/KR2014/001640
§ 371 (c)(1),
(2) Date: Sep. 2, 2015

(87) PCT Pub. No.: WO2014/137105
PCT Pub. Date: Sep. 12, 2014

(65) Prior Publication Data
US 2016/0037491 A1 Feb. 4, 2016

Related U.S. Application Data

(60) Provisional application No. 61/771,923, filed on Mar. 3, 2013.

(51) Int. Cl.
*H04W 4/00* (2009.01)
*H04W 72/04* (2009.01)
(Continued)

(52) U.S. Cl.
CPC ......... *H04W 72/042* (2013.01); *H04L 1/1607* (2013.01); *H04L 5/0051* (2013.01);
(Continued)

(58) Field of Classification Search
CPC .............. H04W 72/042; H04W 72/044; H04L 1/1607; H04L 5/0051; H04L 5/0096; H04L 5/0053
(Continued)

(56) References Cited

U.S. PATENT DOCUMENTS

2011/0170562 A1  7/2011  Hu et al.
2013/0100901 A1*  4/2013  Shan .................. H04L 5/0048
                                                        370/329
(Continued)

FOREIGN PATENT DOCUMENTS

JP    2011-142617 A     7/2011
KR    10-2011-0048429 A  5/2011
(Continued)

*Primary Examiner* — Sai-Ming Chan
(74) *Attorney, Agent, or Firm* — Dentons US LLP

(57) ABSTRACT

In one embodiment of the present specification, provided is a method for receiving control information on an enhanced physical downlink control channel (EPDCCH). The method for receiving control information may comprise the steps of: receiving information associated with a pattern change of a demodulation reference signal (DMRS); identifying a time of changing mapping between an enhanced resource element group (EREG) and an enhanced control channel element (ECCE) for an EPDCCH, according to the pattern change of the DMRS; and receiving control information on the EPDCCH by applying the change of the mapping at the identified time.

15 Claims, 17 Drawing Sheets

(51) Int. Cl.
*H04L 5/00* (2006.01)
*H04L 1/16* (2006.01)

(52) U.S. Cl.
CPC .......... *H04L 5/0053* (2013.01); *H04L 5/0096* (2013.01); *H04W 72/044* (2013.01)

(58) Field of Classification Search
USPC ........................................................ 370/330
See application file for complete search history.

(56) References Cited

U.S. PATENT DOCUMENTS

| 2013/0230017 | A1* | 9/2013 | Papasakellariou | H04W 72/0406 370/330 |
| 2015/0023199 | A1* | 1/2015 | Ishida | H04L 25/0226 370/252 |
| 2015/0049685 | A1* | 2/2015 | Chen | H04L 5/0053 370/329 |

FOREIGN PATENT DOCUMENTS

| KR | 10-2012-0130190 A | 11/2012 |
| KR | 10-2013-0007326 A | 1/2013 |

* cited by examiner

US 9,763,241 B2

METHOD FOR RECEIVING CONTROL INFORMATION ON EPDCCH

This application is a National Stage Entry of International Application No. PCT/KR2014/001640, filed Feb. 27, 2014, and claims the benefit of priority to U.S. Provisional Application No. 61/771,923, filed Mar. 3, 2013, both of which are incorporated by reference in their entirety for all purposes as if fully set forth herein.

BACKGROUND OF THE INVENTION

Field of the Invention

The present invention relates to a method for receiving control information through an enhanced physical downlink control channel (EPDCCH).

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PDCCH is used to transmit control information to a terminal. However, with diversification of control information and an increase in control information quantity, use of only existing PDCCHs reduces flexibility in scheduling. Thus, an enhanced PDCCH (EPDCCH) is adopted in LTE-A.

A base station transmits a demodulation reference signal (DMRS) so that a terminal demodulates an EPDCCH.

However, in recent years, as a significantly low signal-to-interference-plus-noise ratio (SINR, for example, 20 dB lower than in a normal situation) is requested or a terminal travels at very high speed, it is necessary to flexibly change a DMRS pattern.

When a DMRS pattern is changed, however, technical ambiguity in an EPDCCH between a terminal and a serving cell occurs and an imbalance between resource elements including a DMRS is caused.

SUMMARY OF THE INVENTION

Embodiments of the present specification is to solve the foregoing problems.

To achieve the foregoing purposes, one embodiment of the present specification provides a method of receiving control information. The method may comprise: receiving information on a change in a pattern of a demodulation reference signal (DMRS); identifying a time at which mapping between an enhanced control channel element (ECCE) and an enhanced resource element group (EREG) for an enhanced physical downlink control channel (EPDCCH) is changed according to the change in the pattern of the DMRS; and receiving control information through the EPDCCH by applying the changed mapping at the identified time.

The identifying of the time at which the mapping is changed may comprise: receiving a physical downlink control channel (PDCCH), an EPDCCH or a master information block (MIB); and identifying the time at which the mapping is changed through an indication comprised in the PDCCH, the EPDCCH or the MIB.

The identifying of the time at which the mapping is changed may comprise: receiving a PDCCH, an EPDCCH or an MIB from a primary cell or a different secondary cell when a cell in which the pattern of the DMRS is changed is a secondary cell; and identifying the time at which the mapping is changed through an indication comprise in the PDCCH, the EPDCCH or the MIB.

The method may further comprise: transmitting a positive acknowledgement (ACK) or negative acknowledgement (NACK) of the indication.

The pattern of the DMRS may be defined as a number of DMRSs comprised in each physical resource block (PRB) or subframe.

The method may further comprise: receiving one EPDCCH according to a plurality of DRMS patterns.

When a number of resource elements (REs) in which the DMRS is received is greater than a predetermined threshold number per PRB, an aggregation level for a search space for the EPDCCH may be adjusted.

The aggregation level is adjusted based on a number of REs available for EPDCCH transmission in a PRB which comprises no cell-specific reference signal (CRS) or no tracking reference signal (TRS).

To achieve the foregoing purposes, one embodiment of the present specification provides a terminal for receiving control information. The terminal may comprise: a radio frequency (RF) unit to receive information on a change in a pattern of a demodulation reference signal (DMRS); and a processor to identify a time at which mapping between an enhanced control channel element (ECCE) and an enhanced resource element group (EREG) for an enhanced physical downlink control channel (EPDCCH) is changed according to the change in the pattern of the DMRS. The processor controls the RF unit to receive control information through the EPDCCH by applying the changed mapping at the identified time.

Advantageous Effects of the Invention

According to one embodiment of the present specification, when a DMRS pattern is changed, mapping between an enhanced resource element group (EREG) and an enhanced control channel element (ECCE) for an enhanced physical downlink control channel (EPDCCH) may be efficiently managed and changed.

DESCRIPTION OF EXEMPLARY EMBODIMENTS

Figure 1:
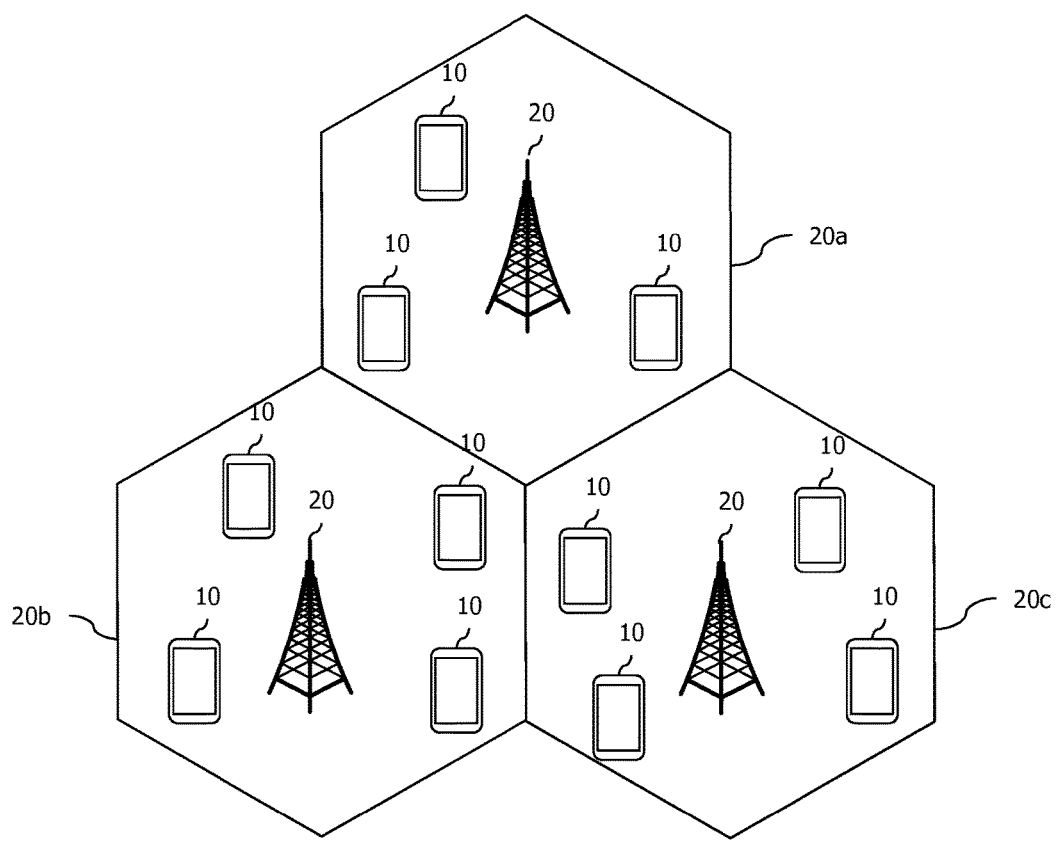
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second.' The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, User Equipment (UE) may be stationary or mobile, and may be denoted by other terms such as device, wireless device, terminal, MS (mobile station), UT (user terminal), SS (subscriber station), MT (mobile terminal) and etc.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 illustrates a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). User equipment (UE) 10 may be fixed or mobile and may be referred to by other names such as terminal, mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The UE generally belongs to one cell and the cell to which the UE belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
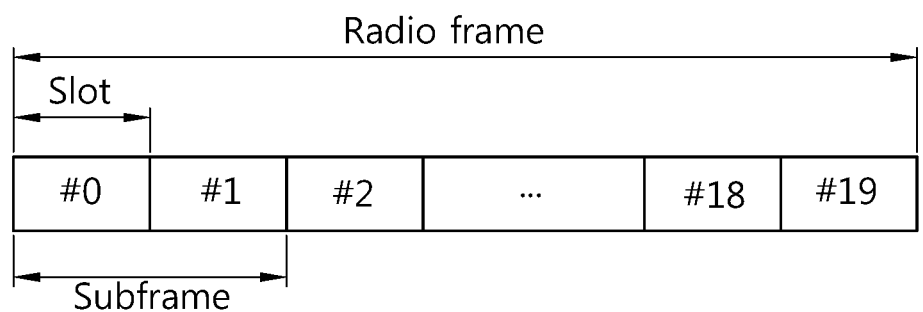
FIG. 2 illustrates a structure of a radio frame according to frequency division duplex (FDD) in 3rd generation partnership project (3GPP) long term evolution (LTE).

FIG. 2 illustrates a structure of a radio frame according to FDD in 3rd generation partnership project (3GPP) long term evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
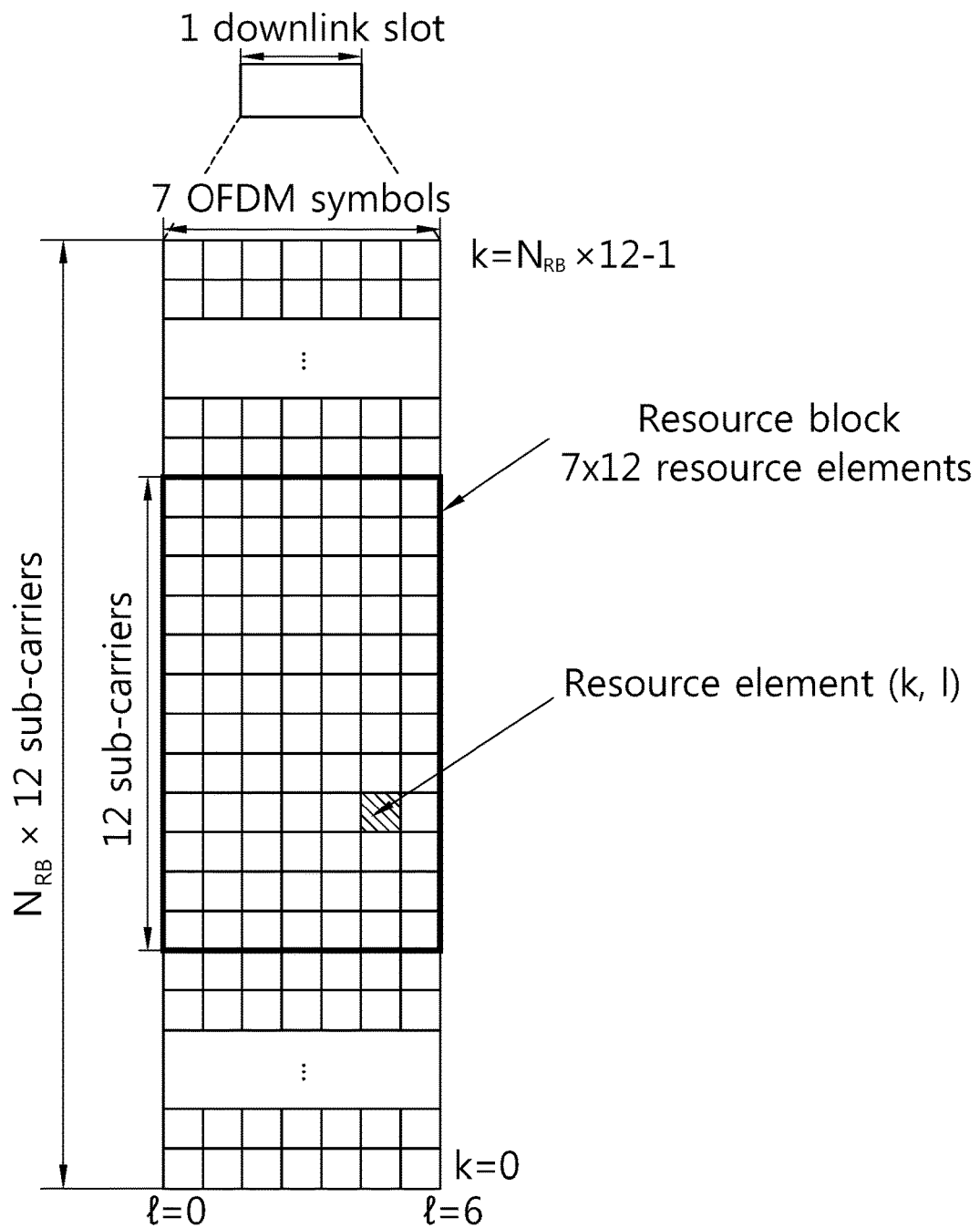
FIG. 3 illustrates a resource grid for a single uplink or downlink slot in 3GPP LTE.

FIG. 3 illustrates a resource grid for a single uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
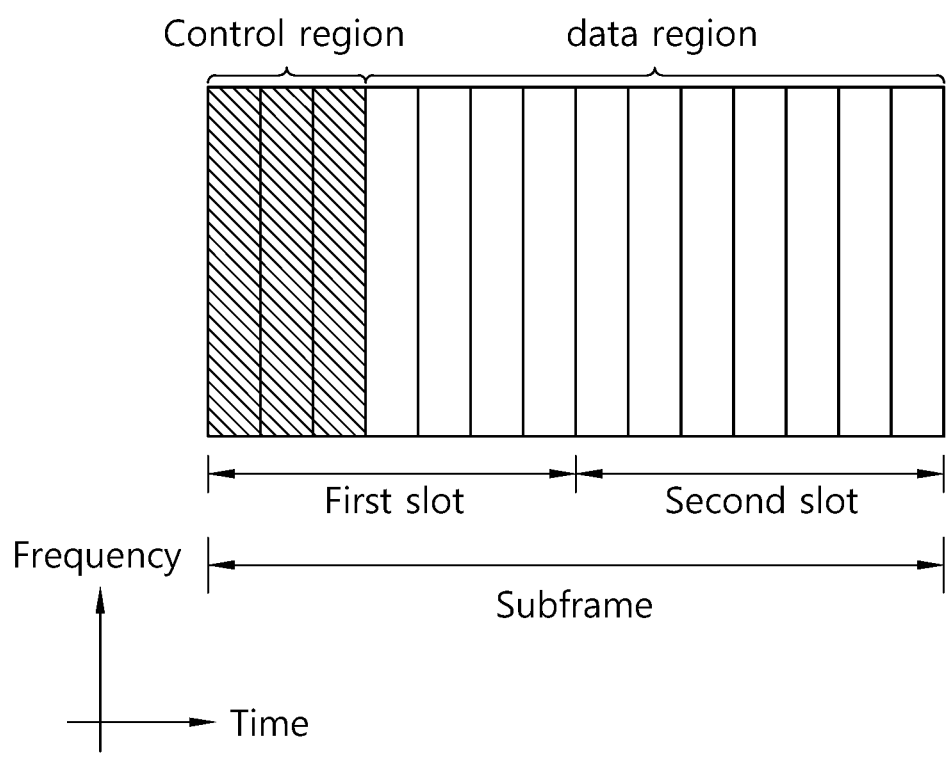
FIG. 4 illustrates a structure of a downlink subframe.

FIG. 4 illustrates a structure of a downlink subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 4, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 5:
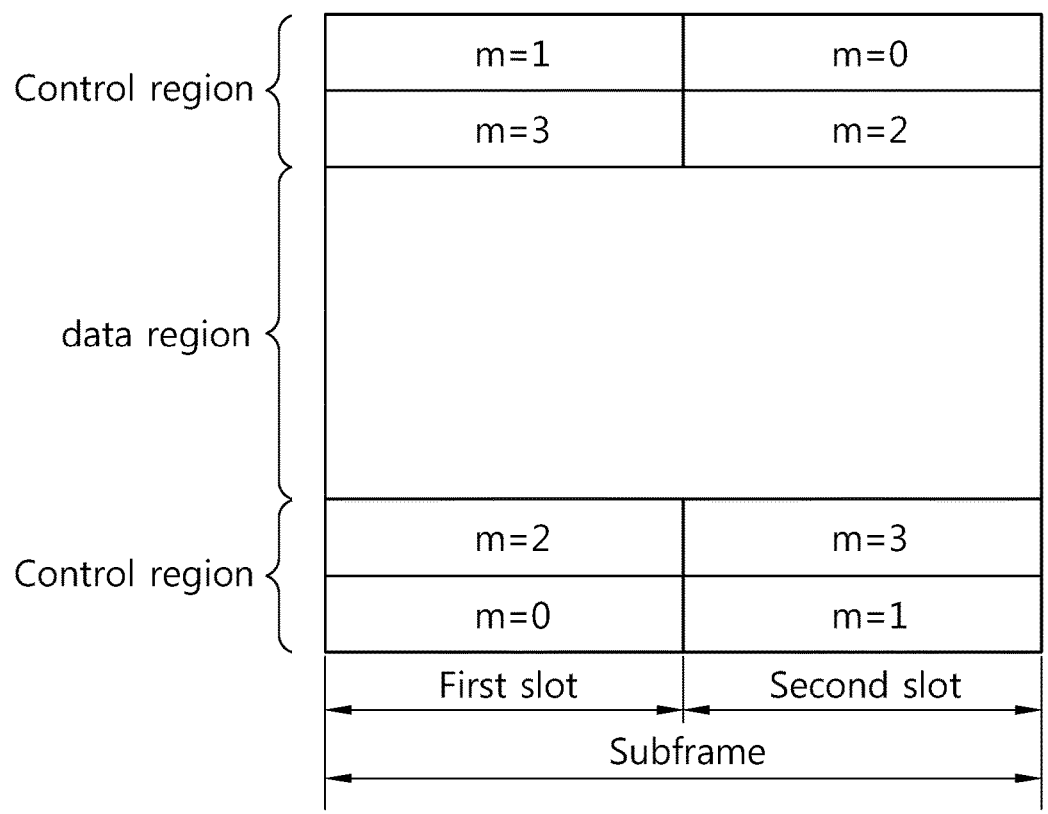
FIG. 5 illustrates a structure of an uplink subframe in 3GPP LTE.
Figure 5:
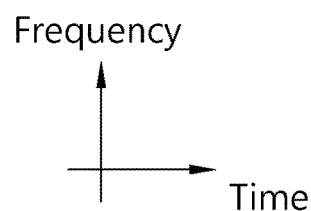

FIG. 5 illustrates a structure of an uplink subframe in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 6:
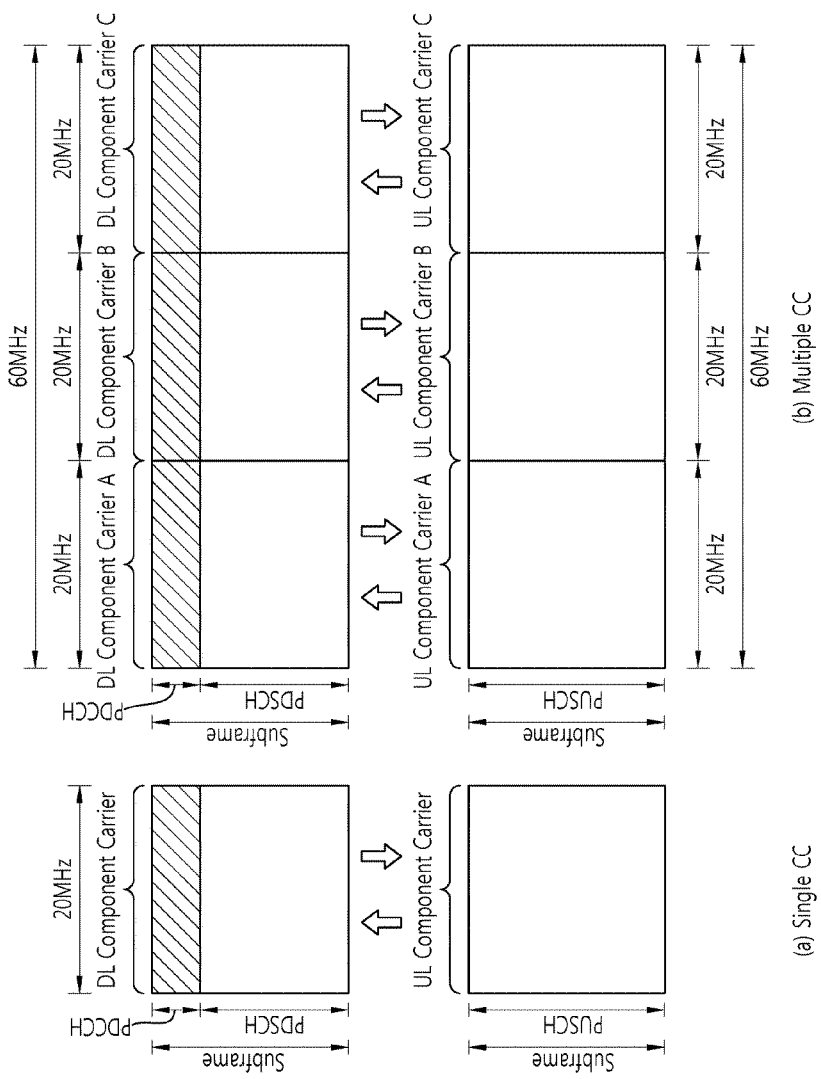
FIG. 6 illustrates an example of comparison between a single carrier system and a carrier aggregation system.

FIG. 6 illustrates an example of comparison between a single carrier system and a carrier aggregation system.

Referring to FIG. 6, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC)

and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 7:
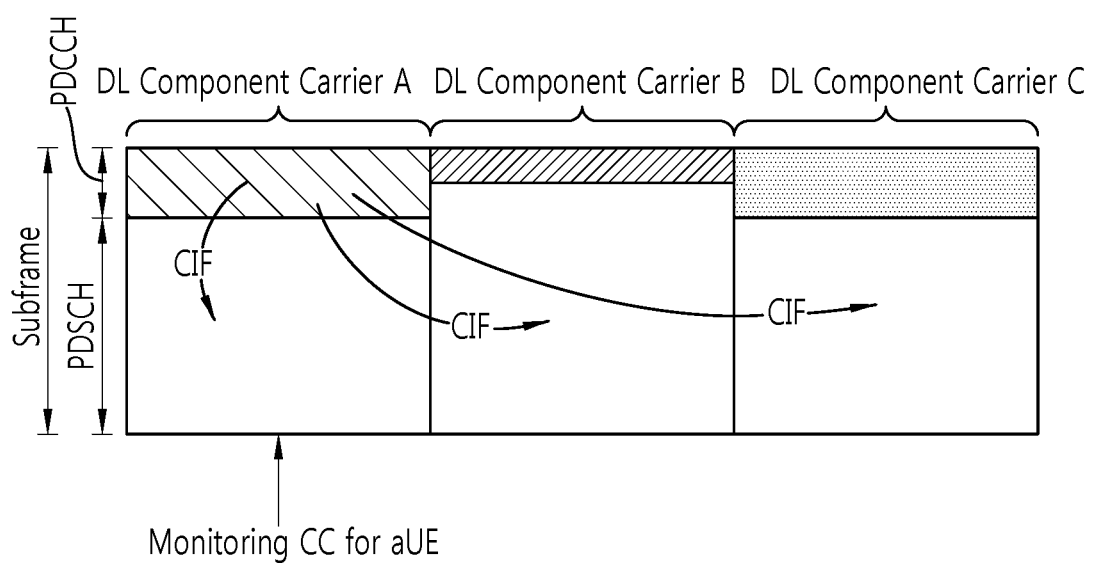
FIG. 7 illustrates cross-carrier scheduling in the carrier aggregation system.

FIG. 7 illustrates cross-carrier scheduling in the carrier aggregation system.

Referring to FIG. 7, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 7 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 8:
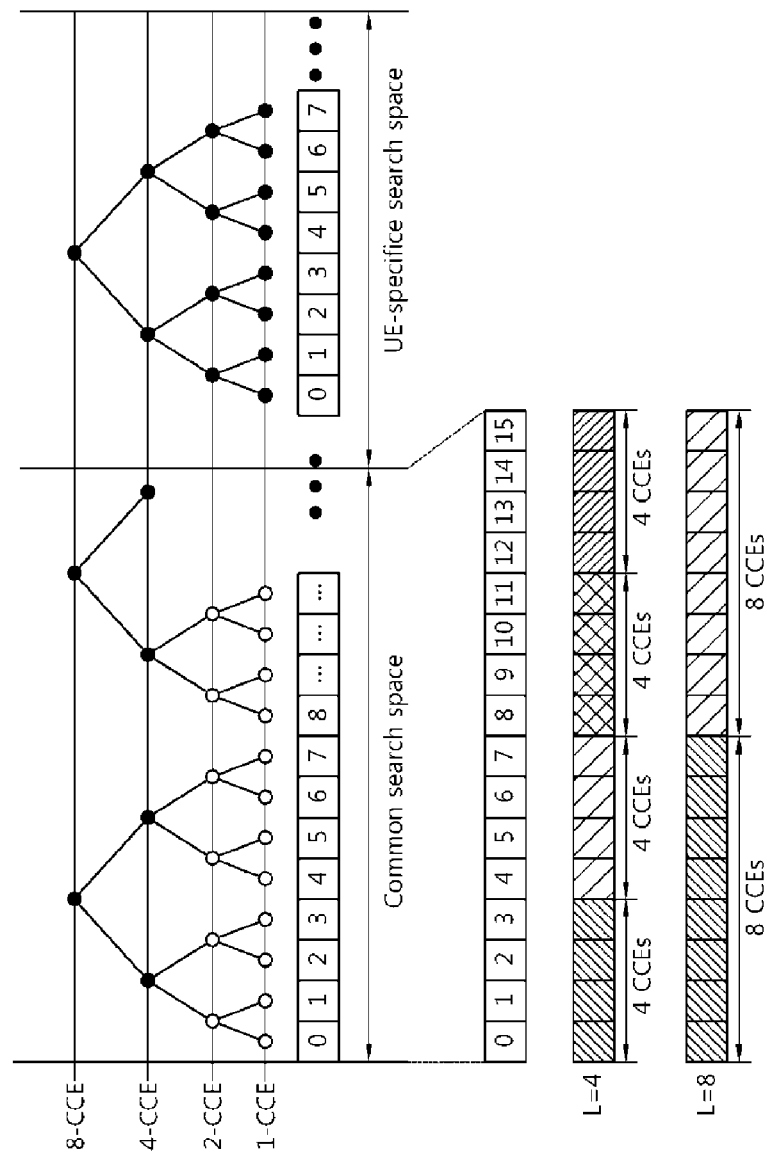
FIG. 8 illustrates an example of monitoring a physical downlink control channel (PDCCH).

FIG. 8 illustrates an example of monitoring a PDCCH.

The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L·{1,2,3,4}, a search space S(L)k is defined as a set of PDCCH candidates. A CCE corresponding to a PDCCH candidate m of the search space S(L)k is given by Equation 1 below.

$$L \cdot \{(Y_k + m') \bmod \lfloor N_{CCE,k}/L \rfloor\} + i \qquad \text{[Equation 1]}$$

Herein, i=0, 1, ..., L-1, m=0, ..., $M^{(L)}$-1, and $N_{CCE,k}$ denotes the total number of CCEs that can be used for PDCCH transmission in a control region of a subframe k. The control region includes a set of CCEs numbered from 0 to $N_{CCE,k-1}$. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k(A \cdot Y_{k-1}) \bmod D \qquad \text{[Equation 2]}$$

Herein, $Y_{-1}=n_{RNTI} \neq 0$, A=39827, D=65537, k=floor($n_s$/2), and ns denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single-antenna port, port 0 |
| | DCI format 1 | UE specific | Single-antenna port, port 0 |
| Mode 2 | DCI format 1A | common and UE specific | Transmit diversity |
| | DCI format 1 | UE specific | Transmit diversity |
| Mode 3 | DCI format 1A | common and UE specific | Transmit diversity |
| | DCI format 2A | UE specific | CDD(Cyclic Delay Diversity) or Transmit diversity |

TABLE 2-continued

| Transmission mode | DCI format | search space | Transmission mode of PDSCH based on PDCCH |
|---|---|---|---|
| Mode 4 | DCI format 1A | common and UE specific | Transmit diversity |
| | DCI format 2 | UE specific | Closed-loop spatial multiplexing |
| Mode 5 | DCI format 1A | common and UE specific | Transmit diversity |
| | DCI format 1D | UE specific | MU-MIMO(Multi-User Multiple Input Multiple Output) |
| Mode 6 | DCI format 1A | common and UE specific | Transmit diversity |
| | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
| | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
| | DCI format 2B | UE specific | Dual layer transmission (port 7 or 8), or a single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Figure 9:
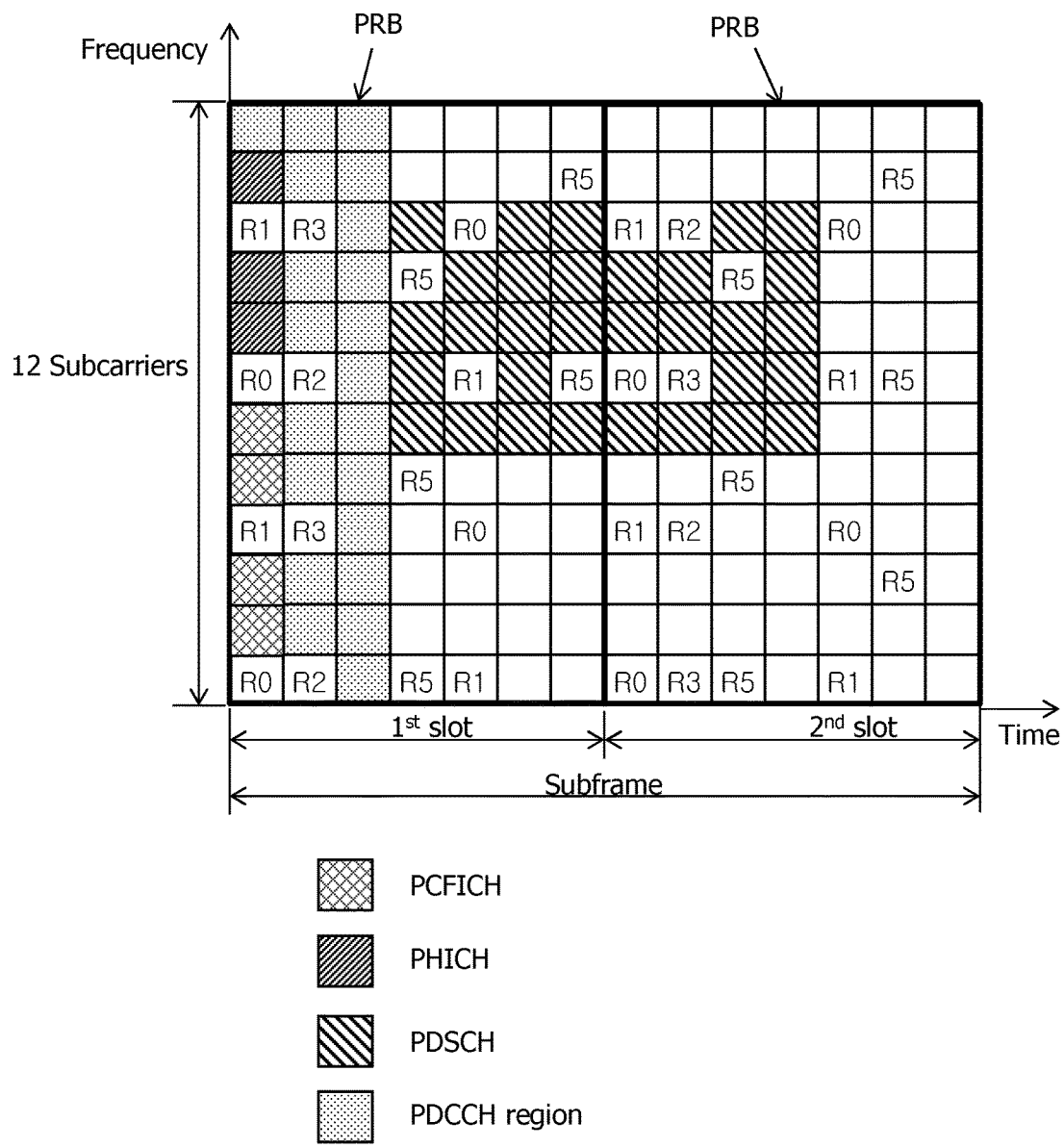
FIG. 9 illustrates an arrangement of a reference signal and a control channel in a downlink (DL) subframe of 3GPP LTE.

FIG. 9 illustrates an arrangement of a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns(m)}$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m=0, 1, . . . , $2N_{maxRB}$−1. $N_{maxRB}$ is the maximum number of RBs. ns is a slot number in a radio frame. l is an OFDM symbol index in a slot.

A pseudo-random sequence c(i) is defined by a length-31 gold sequence as follows.

$c(n)=(x_1(n+Nc)+x_2(n+Nc))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 4]

Herein, Nc=1600, and a first m-sequence is initialized as $x_1(0)=1$, $x_1(n)=0$, m=1, 2, . . . , 30.

A second m-sequence is initialized as $c_{init}=2^{10}(7(ns+1)+l+1)(2N^{cell}_{ID}+1)+2N^{cell}_{ID}+N^{CP}$ at a start of each OFDM symbol.

$N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns(m)}$ for the URS is equivalent to Equation 3. In this case, m=0, 1, . . . , $12N_{PDSCH,RB}$−1, and $N_{PDSCH,RB}$ is the number of RBs used for transmission of a corresponding PDSCH. A pseudo-random sequence generator is initialized as $c_{init}=$ (floor(ns/2)+1)($2N^{cell}_{ID}$+1)216+$n_{RNTI}$ at a start of each subframe. $N_{RNTI}$ is an identifier of the wireless device.

The aforementioned initialization method is for a case where the URS is transmitted through the single antenna, and when the URS is transmitted through multiple antennas, the pseudo-random sequence generator is initialized as cinit=(floor(ns/2)+1)($2N^{cell}_{ID}$+1)216+$n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |

TABLE 4-continued

| Layer | [w(0) w(1) w(2) w(3)] |
|---|---|
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 10:
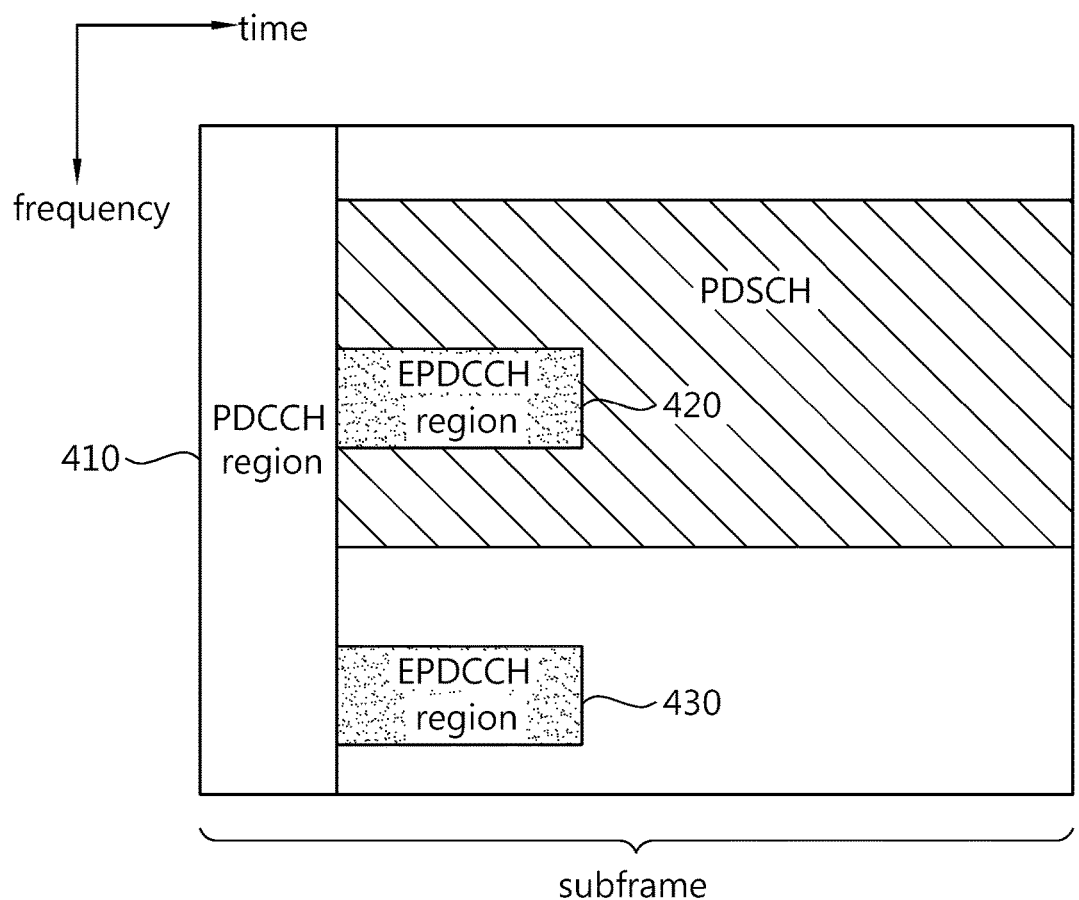
FIG. 10 illustrates a subframe having an enhanced PDCCH (EPDCCH).

FIG. 10 illustrates a subframe having an EPDCCH.

A subframe may include a zero or one PDCCH region 410 or zero or more EPDCCH regions 420 and 430.

The EPDCCH regions 420 and 430 are regions in which a wireless device monitors an EPDCCH. The PDCCH region 410 is located in up to four front OFDM symbols of a subframe, while the EPDCCH regions 420 and 430 may flexibly be scheduled in OFDM symbols after the PDCCH region 410.

One or more EPDCCH regions 420 and 430 may be designated for the wireless device, and the wireless devices may monitor an EPDCCH in the designated EPDCCH regions 420 and 430.

The number/location/size of the EPDCCH regions 420 and 430 and/or information on a subframe for monitoring an EPDCCH may be provided by a base station to a wireless device through an RRC message or the like.

In the PDCCH region 410, a PDCCH may be demodulated based on a CRS. In the EPDCCH regions 420 and 430, a demodulation (DM) RS may be defined, instead of a CRS, for demodulation of an EPDCCH. An associated DM RS may be transmitted in the corresponding EPDCCH regions 420 and 430.

The respective EPDCCH regions 420 and 430 may be used for scheduling of different cells. For example, an EPDCCH in the EPDCCH region 420 may carry scheduling information for a primary cell, and an EPDCCH in the EPDCCH region 430 may carry scheduling information for a secondary cell.

When an EPDCCH is transmitted through multiple antennas in the EPDCCH regions 420 and 430, the same precoding as that for the EPDCCH may be applied to a DM RS in the EPDCCH regions 420 and 430.

A PDCCH uses a CCE as a transmission resource unit, and a transmission resource unit for an EPDCCH is referred to as an enhanced control channel element (ECCE). An aggregation level may be defined as a resource unit for monitoring an EPDCCH. For example, when 1 ECCE is a minimum resource for an EPDCCH, an aggregation level may be defined as L={1, 2, 4, 8, 16}.

Hereinafter, an EPDDCH search space may correspond to an EPDCCH region. In the EPDCCH search space, one or more EPDCCH candidates may be monitored by one or more aggregation levels.

Hereinafter, resource allocation for an EPDCCH will be described.

An EPDCCH is transmitted using one or more ECCEs. An ECCE includes a plurality of enhanced resource element groups (EREGs). An ECCE may include four EREGs or eight EREGs depending on a subframe type and CP based on a TDD DL-UL configuration. For example, an ECCE may include four EREGs in a normal CP, and an ECCE may include eight EREGs in an extended CP.

A physical resource block (PRB) pair refers to two PRBs having the same RB number in a single subframe. A PRB pair refers to a first PRB of a first slot and a second PRB of a second slot in the same frequency domain. In a normal CP, a PRB pair includes 12 subcarriers and 14 OFDM symbols and thus 168 resource elements (REs).

An EPDCCH search space may be set up with one or a plurality of PRB pairs. One PRB pair includes 16 EREGs. Thus, when an ECCE includes four EREGs, a PRB pair includes four ECCEs. When an ECCE includes eight EREGs, a PRB pair includes two ECCEs.

Figure 11:
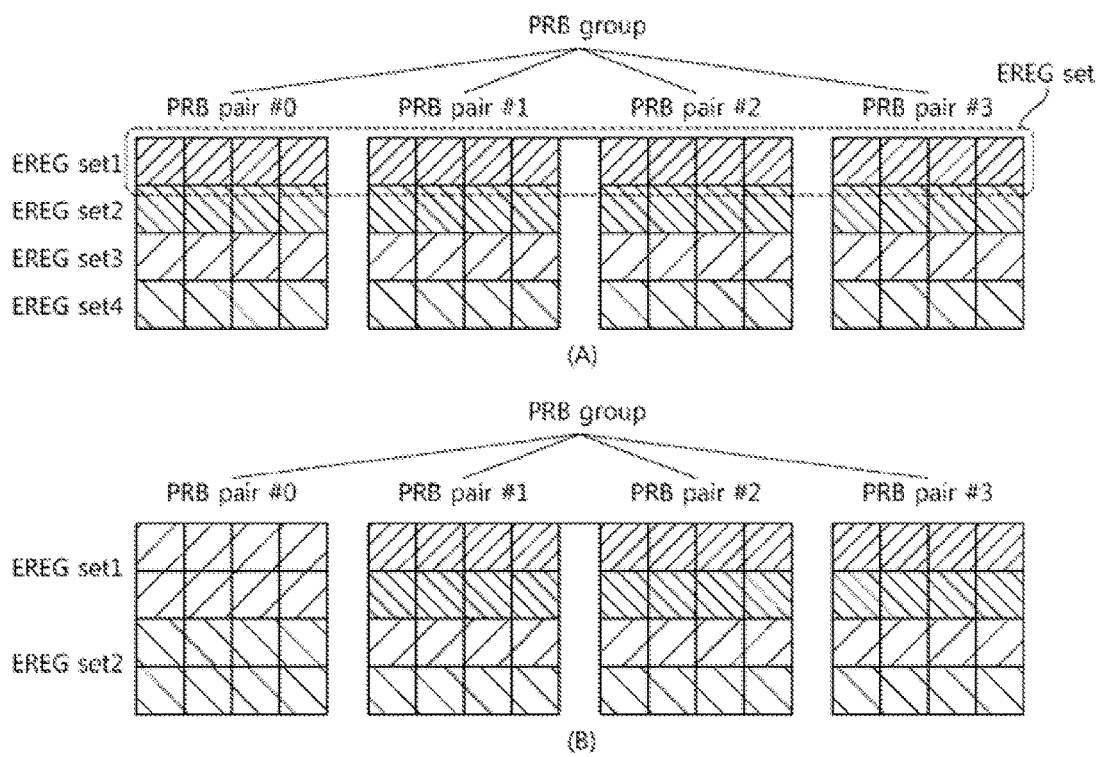
FIG. 11 illustrates a structure of a PRB pair.

FIG. 11 illustrates a structure of a PRB pair.

Although a PRB group includes four PRB pairs, the number of RPB pairs is not limited.

(A) in FIG. 11 illustrates an EREG set when an ECCE includes four EREGs. (B) in FIG. 11 illustrates an EREG set when an ECCE includes eight EREGs.

Hereinafter, unless indicated otherwise, an ECCE is defined to include four EREGs.

An EPDCCH supports localized transmission and distributed transmission. In localized transmission, EREGs constituting one ECCE are transmitted in one PRB pair. In distributed transmission, EREGs constituting one ECCE are transmitted in a plurality of PRB pairs.

Figure 12:
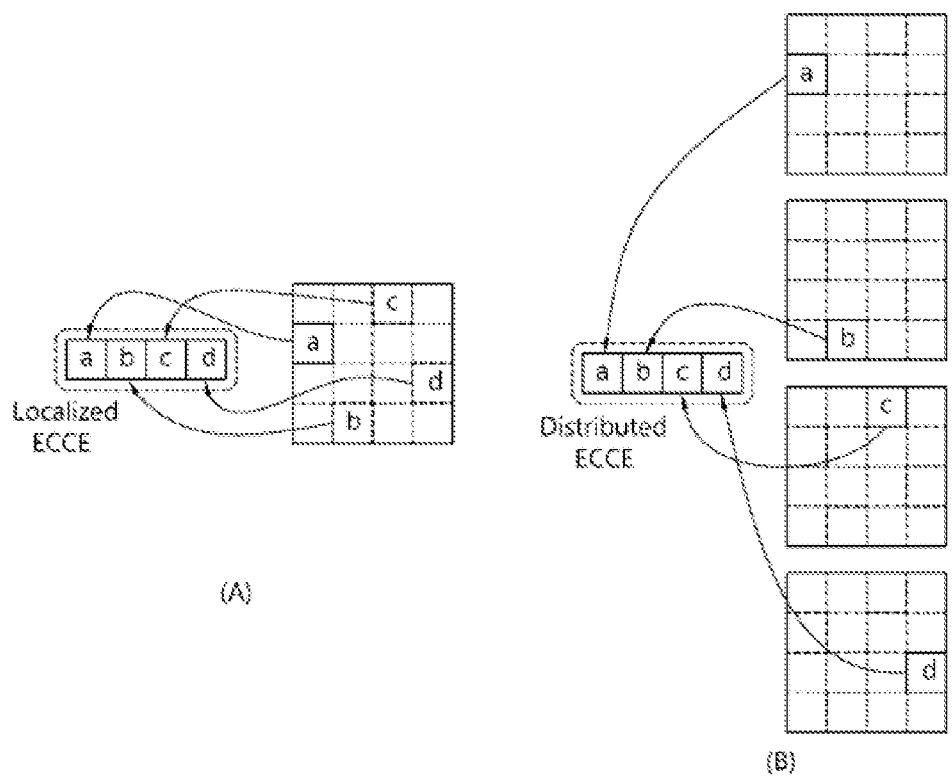
FIG. 12 illustrates examples of localized transmission and distributed transmission.

FIG. 12 illustrates examples of localized transmission and distributed transmission.

(A) in FIG. 12 illustrates an example of ECCE-to-EREG mapping in localized transmission. A localized ECCE refers to an ECCE used for localized transmission. (B) in FIG. 12 illustrates an example of ECCE-to-EREG mapping in distributed transmission. A distributed ECCE refers to an ECCE used for distributed transmission.

An EREG set refers to an EREG set used to constitute a localized ECCE or distributed ECCE. That is, an ECCE may be understood to include EREGs belonging to the same EREG set.

TABLE 5

| | Number of ECCEs for one EPDCCH, $N^{ECCE}_{EPDCCH}$ | | | |
|---|---|---|---|---|
| | Case 1 | | Case 2 | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

Case 1 is applied when DCT format 2A, 2B, 2C or 2D is used and $N^{DL}_{RB} > 25$. Alternatively, case 1 is applied for a random DCI format when in TDD, nEPDCCH<104 is satisfied and a normal CP is used in a general subframe or special subframe with configuration 3, 4 or 8. Otherwise, case 2 may be applied.

Hereinafter, transmission of a DM RS associated with an EPDCCH according to one embodiment of the present invention will be described.

An EPDCCH is demodulated based on a DMRS to obtain a precoding gain, unlike a PDCCH demodulated based on a CRS.

An RS sequence $r_{ns}(m)$ for a DM RS associated with an EPDCCH is the same as Equation 3. Here, m=0, 1, ..., $12N_{RB}-1$ and $N_{RB}$ is the maximum number of RBs. A pseudorandom number generator may be initialized at the beginning of each subframe as follows:

$$c_{init} = (\text{floor}(ns/2)+1)(2N_{EPDCCH,ID}+1)2^{16} + n_{EPDCCH,SCID}$$

ns is the number of a slot in a wireless frame, $N_{EPDCCH,ID}$ is a cell index associated with a corresponding EPDCCH region, and $n_{EPDCCH,SCID}$ is a scrambling identity (SCID) given from upper layer signaling.

Figure 13:
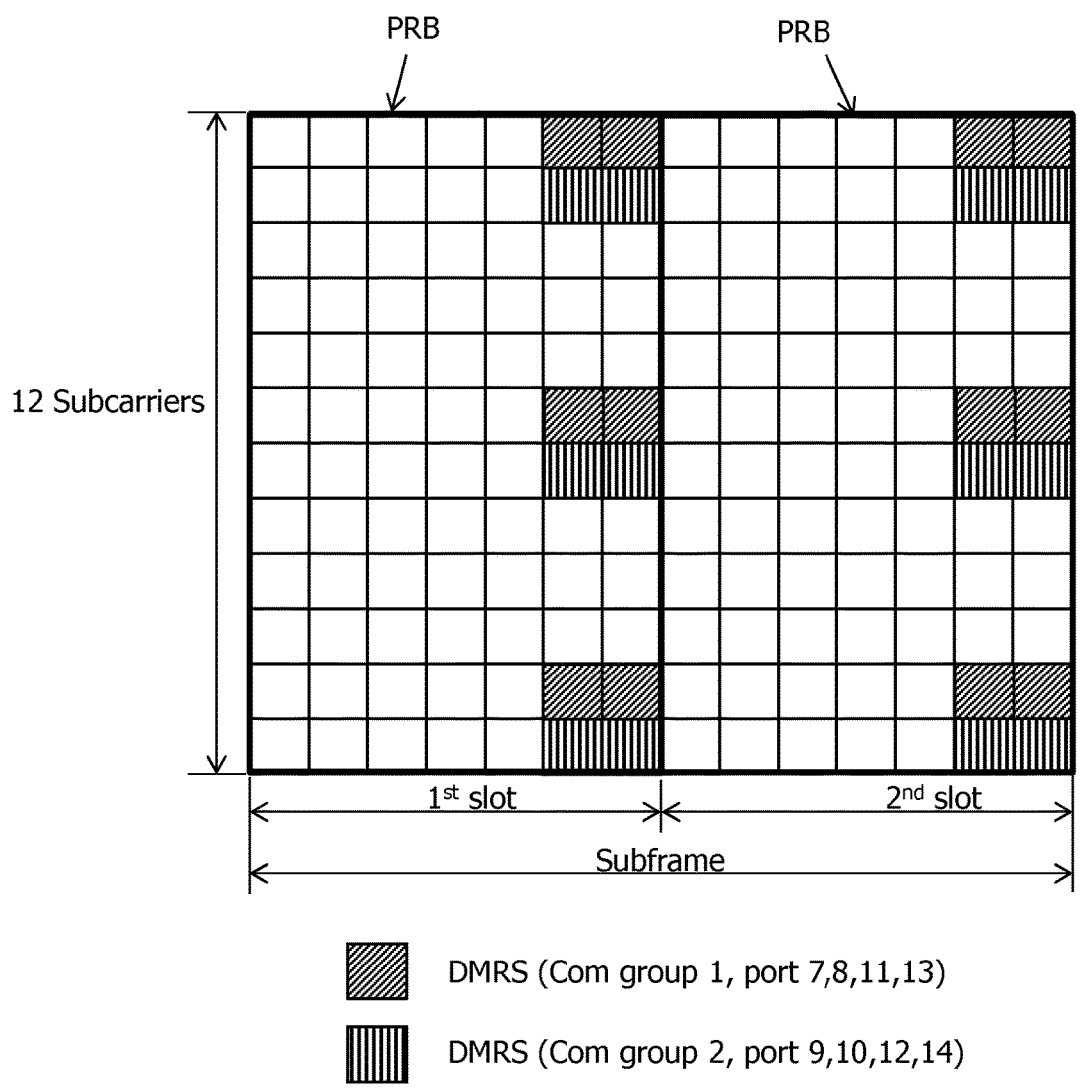
FIG. 13 illustrates an example of RE mapping for a DMRS.

FIG. 13 illustrates an example of RE mapping for a DMRS.

A DMRS may allow channel estimation by using different methods for a spreading factor K. In a normal CP, the spreading factor K is 4 and FIG. 13 illustrates RE mapping in the normal CP. In an extended CP, the spreading factor K is 2.

When an antenna port p for a DM RS satisfies p∈{107, 108, 109, 110}, an example of a spreading sequence with a spreading factor K of 4 is as follows.

TABLE 6

| Antenna port p | [$w_p(0)$ $w_p(1)$ $w_p(2)$ $w_p(3)$] |
|---|---|
| 107 | [+1 +1 +1 +1] |
| 108 | [+1 −1 +1 −1] |
| 109 | [+1 +1 +1 +1] |
| 110 | [+1 −1 +1 −1] |

When an RS sequence $r_{ns}(m)$ is mapped onto a symbol $a^{(p)}_{k,l}$ by a PRB $n_{PRB}$, RE mapping may be represented by the following equation.

$$a^{(p)}_{k,l} = w_p(l') \cdot r(3 \cdot l' \cdot N^{max,DL}_{RB} + 3 \cdot n_{PRB} + m') \quad [\text{Equation 5}]$$

Here, $$w_p(i) = \begin{cases} \overline{w}_p(i) & (m' + n_{PRB})\text{mod}2 = 0 \\ \overline{w}_p(3-i) & (m' + n_{PRB})\text{mod}2 = 1 \end{cases}$$

$$k = 5m' + N^{RB}_{sc} n_{PRB} + k'$$

$$k' = \begin{cases} 1 & p \in \{107, 108\} \\ 0 & p \in \{109, 110\} \end{cases}$$

$l = l' \text{mod} 2 + 5$ if not in a special subframe $l' = $ $\begin{cases} 0, 1 & \text{if } n_s \text{mod} 2 = 0 \text{ and not in special subframe} \\ 2, 3 & \text{if } n_s \text{mod} 2 = 1 \text{ and not in special subframe} \end{cases}$ $m' = 0, 1, 2$ An example of a spreading sequence with a spreading factor K of 2 is as follows.

TABLE 7

| Antenna port p | [$w_p(0)$ $w_p(1)$] |
|---|---|
| 107 | [+1 +1] |
| 108 | [−1 +1] |

As seen from Tables 6 and 7, in the case of the antenna port p∈{107, 108, 109, 110}, a wireless device recognizes that the spreading factor is 4. In the case of the antenna port p∈{107, 108}, the wireless device recognizes that the spreading factor is 2. When the spreading factor is 2, the wireless device despreads a DM RS of a first slot and a DM RS of a second slot using a spreading sequence with K=2, followed by time interpolation to estimate a channel. When K=4, the entire subframe is despread using a spreading sequence with K=4 to estimate a channel. A channel estimation process varies depending on a spreading factor. When a spreading sequence with K=2 is used, a gain in high mobility may be obtained through time interpolation. When a spreading sequence with K=4 is used, a greater number of wireless devices or higher ranks may be supported.

As described above, an EPDCCH is transmitted through a single PRB pair. For example, in the normal CP, a single PRB pair includes 168 REs, which means that the PRB pair includes up to four ECCEs. When an aggregation level L=1 is used, four EPDCCHs may be transmitted in a PRB pair. When one ECCE is divided into two sub-CCEs in order to obtain a frequency diversity gain, up to eight EPDCCHs may be transmitted in one PRB pair, in which K=4 is considered.

In a corresponding subframe, a PDCCH region occupies up to three OFDM symbols and an overhead of a CRS and/or URS and a DM RS is considered, resources available for an EPDCCH are reduced. When the number of available ECCEs and the number of EPDCCHs (or number of wireless devices) which can be multiplexed to one PRB pair decrease, K=2 may needed to be used.

BRIEF DESCRIPTION OF EMBODIMENTS OF THE PRESENT SPECIFICATION

As described above, DCI on a PDSCH may be transmitted through a DMRS-based control channel, that is, an EPDCCH.

However, it may be considered for a future system that a DMRS pattern is flexibly changed in order to accommodate circumstances in which a significantly low signal-to-interference-plus-noise ratio (SINR, for example, 20 dB lower than in a normal situation) is requested or a terminal travels at high speed. Here, a change in a DMRS may indicate not only a simple change in the location of a DMRS in time/frequency domains but a change in the density of REs including a DMRS. A DMRS pattern change may be reported to a UE through a signal of an upper layer. Alternatively, a DMRS pattern may be changed semi-statically according to certain criteria.

Figure 14:
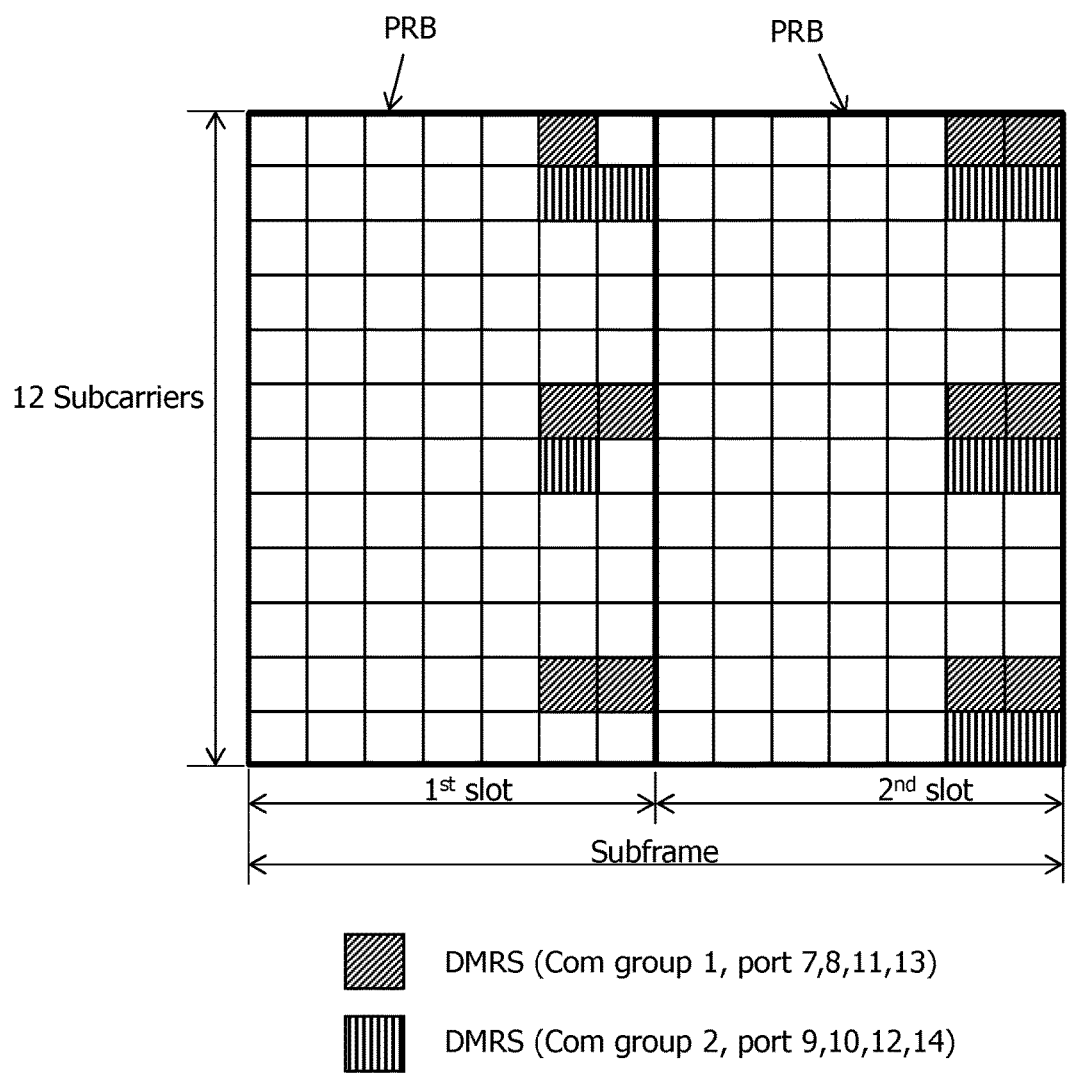
FIG. 14 illustrates a change in a DMRS pattern

FIG. 14 illustrates a change in a DMRS pattern.

In a future system, a DMRS pattern, that is, the density of REs including a DMRS, may be set in a different manner by each PRB and subframe. Here, RE density may be represented by the number of REs including DMRSs per PRB (or alternatively the number of REs excluding DMRSs per PRB). That is, as illustrated in FIG. 14, the density of REs including DMRSs in a PRB of a left $1^{st}$ slot and the density of REs including DMRSs in a PRB of a right $2^{nd}$ slot may be different from each other. Alternatively, RE density may vary by subframe.

Meanwhile, when the DMRS pattern is changed, changes in a EREG and ECCE may be requested even in the case of a DMRS-based EPDCCH, because an EREG is allocated per PRB for REs excluding DMRSs for an EPDCCH.

However, technical ambiguity in an EPDCCH between a UE and a serving cell may occur at a time when the DMRS pattern is changed. Such a problem may simply be resolved by allowing a DRMS pattern change for a PDSCH and not allowing a DMRS pattern change for an EPDCCH. However, when the DMRS pattern is changed, channel estimation may not be adequately performed to deteriorate detection performance of the EPDCCH. Thus, this simple solution may not be optimal. The aforementioned problem may also be resolved simply as the UE performs blinding decoding on the EPDCCH by DMRS pattern. However, since the number of blind decoding times increases by a multiple of the number of DMRS pattern candidates, this simple solution may cause deterioration in performance.

First Embodiment

Thus, a first embodiment of the present specification proposes a method for solving technical ambiguity in EPDCCH mapping between a UE and a serving cell during a DMRS pattern change period.

Figure 15:
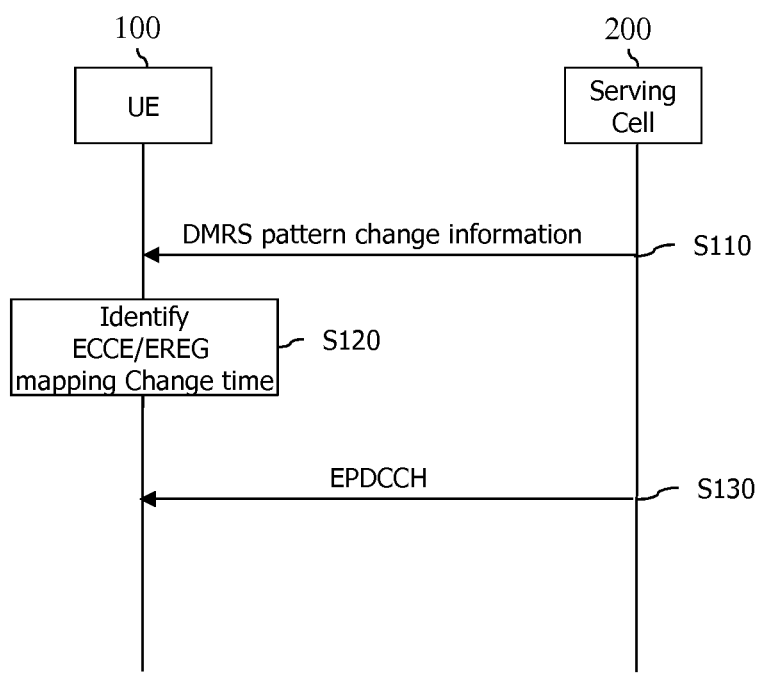
FIG. 15 is a flowchart illustrating a method for a DMRS pattern change according to a first embodiment of the present specification.

FIG. 15 is a flowchart illustrating a method for a DMRS pattern change according to a first embodiment of the present specification.

As illustrated in FIG. 15, a serving cell 200 transmits DMRS pattern change information to a UE (S110).

The UE 100 receives the DMRS pattern change information and identifies a time when mapping between an ECCE and an ERGE for an EPDCCH is changed (S120).

The UE 100 applies the changed mapping at the identified time to receive the EPDCCH (S130).

The ERGE/ECCE mapping for the EPDCCH may be changed based on a parameter according to EPDCCH set information. The EPDCCH set may be defined by a PRB region and a subframe region where EPDCCH candidates may be present. In the EPDCCH set, an EREG may include an RE based on the changed DMRS pattern. Thus, the UE may recognize the EREG based on the changed DMRS pattern in detecting the EPDCCH. Meanwhile, in existing 3GPP Release 11, an EPDCCH is not allowed to be transmitted in a PRB where a synchronization signal, for example, a primary synch signal (PSS)/secondary synch signal (SSS), is transmitted. In one embodiment, however, the EPDCCH may be transmitted in a PRB where a PSS/SSS is transmitted. Here, when the entire region or part of the PRB where the PSS/SSS is transmitted overlaps with the EPDCCH, the UE and the serving cell may assume that the DMRS pattern is changed for the corresponding PRB region and the subframe region. The changed DMRS pattern may be a pattern with an avoided or minimized collision with the synchronization signal. When there is a plurality of such patterns, a DMRS pattern with a smallest index may be preferentially used.

The time when the mapping between the ECCE and the ERGE for the EPDCCH is changed may be signaled by the serving cell to the UE. Here, the time when the mapping is changed may vary depending on a DMRS pattern set in the upper layer. Here, the EREG/ECCE mapping change time may be signaled after or simultaneously with signaling of the DMRS pattern change.

Signaling the EREG/ECCE mapping change time may be performed by a plurality of methods as follows.

In a first method, signaling the EREG/ECCE mapping change time may be performed through a master information block (MIB). That is, the change time may be signaled to the UE using unused bits in the MIB.

In a second method, signaling the EREG/ECCE mapping change time may be performed through a PDCCH or EPDCCH transmitted in the same cell. When the PDCCH is used in signaling, the cell may include a CRS for demodulation. Information on the mapping change time may be included in a new DCI format for the PDCCH or EPDCCH or in all or part of field values for a specific DCI format.

In a third method, when a cell corresponding to the DMRS pattern change is a secondary cell (SCell), the information on the EREG/ECCE mapping change time may be signaled to the UE through a PDCCH or EPDCCH of a primary cell or another secondary cell or a PDSCH.

In a fourth method, when the UE is connected to at least two cells and the DMRS pattern is changed with respect to any one of the two cells, the information on the EREG/ECCE mapping change time may be transmitted to the UE through a PDCCH or EPDCCH of the other cell of the two cells or a PDSCH. The other cell may be a scheduling cell for the cell corresponding to the DMRS pattern change which is set in cross-scheduling and may be a macrocell.

When the information on the EREG/ECCE mapping change time is detected in an nth subframe, the UE 100 may apply the changed DMRS pattern and the changed EREG/ECCE mapping from an (n+k)th subframe and accordingly reset the EPDCCH search space. Likewise, the serving cell may apply the changed DMRS pattern from the (n+k)th subframe after transmitting the information on the EREG/ECCE mapping change time in the nth frame, and change the EREG/ECCE mapping to transmit the EPDCCH.

When the UE receives the change time information using the PDCCH or EPDCCH, the UE may transmit a HARQ-ACK of the PDCCH/EPCCH. To this end, a specific HARQ process may be designated for the PDCCH/EPDCCH. For example, HARQ process ID=7 may be designated for ACK/NACLL transmission with respect to the PDCCH/EPDCCH.

Meanwhile, a DCI format of the PDCCH/EPDCCH for transmitting the change time information may be different from a DIC format for existing downlink scheduling or an uplink grant. For example, when TM9 is set up, in addition to DCI format 2C/0/1A, a new DCI format may be used to dynamically transmit information, other than that for an uplink grant or downlink scheduling, in a specific subframe to the UE. Such DCI may be similar to a format used for an uplink grant but have a resource allocation field entirely filled with bit 0. Thus, when a DCI with a format similar to that used for an uplink grant is received, the UE transmits an ACK/NACK but recognizes that there is no transmission of a PUSCH. In order not to increase complexity in blind decoding of the UE, the new DCI format may be transmitted only on the specific subframe. Information on such subframes may be provided to the UE through an upper-layer signal. Alternatively, the subframe is designated in advance and is recognized by the UE without separate signaling. For example, the UE recognizes that the UE may receive DCIs in a first subframe of a first radio frame of 80 msec. Alternatively, the UE recognizes that the UE may receive such DCIs a paging subframe thereof. In this case, the serving cell may need to receive an ACK from the UE before an application time. During a period of an EREG/ECCE mapping change by the DMRS pattern change, the serving cell may utilize an SPS PDSCH by using only a PDCCH instead of an EPDCCH or using a PDCCH/EPDCCH just before the change period.

Although the method of reporting the EREG/ECCE mapping change time for the EPDCCH when the DMRS pattern is changed has been described above, the foregoing technical content may be applied at a time when a PDSCH/PSS/SSS/PBCH/PUSCH/PUCCH is applied due to a DMRS pattern change. For example, in the case of a PDSCH, a DMRS pattern for retransmission may be adapted in the same manner as for initial transmission of a corresponding TB or the DMRS pattern may be determined to be changed or maintained depending on a PDCCH/EPDCCH. In the case of a PUSCH, a DMRS pattern for retransmission may be adapted in the same manner as for initial transmission of a corresponding TB or the DMRS pattern may be determined to be changed or maintained through a PHICH/EPHICH.

Second Embodiment

As mentioned above, in a future system, a DMRS pattern, that is, the density of REs including a DMRS, may be set in a different manner by each PRB and subframe. That is, as illustrated in FIG. 14, the density of REs including DMRSs in a PRB of a left $1^{st}$ slot and the density of REs including DMRSs in a PRB of a right $2^{nd}$ slot may be different from each other. Alternatively, RE density may vary by subframe. Such a DMRS pattern change may occur in a specific situation or by a setting in an upper layer.

Depending on the DMRS pattern change, single EPDCCH transmission may include a plurality of DMRS patterns. This situation may be called an RE imbalance, and a difference in the number of REs included in an EREG or ECCE may occur with respect to PRBs with different DMRS patterns. When the density of REs including DMRSs is high, a lack of REs for an EPDCCH in a corresponding RPB may cause a decrease in code rate. Thus, a second embodiment presents a solution for this problem.

Figure 16:
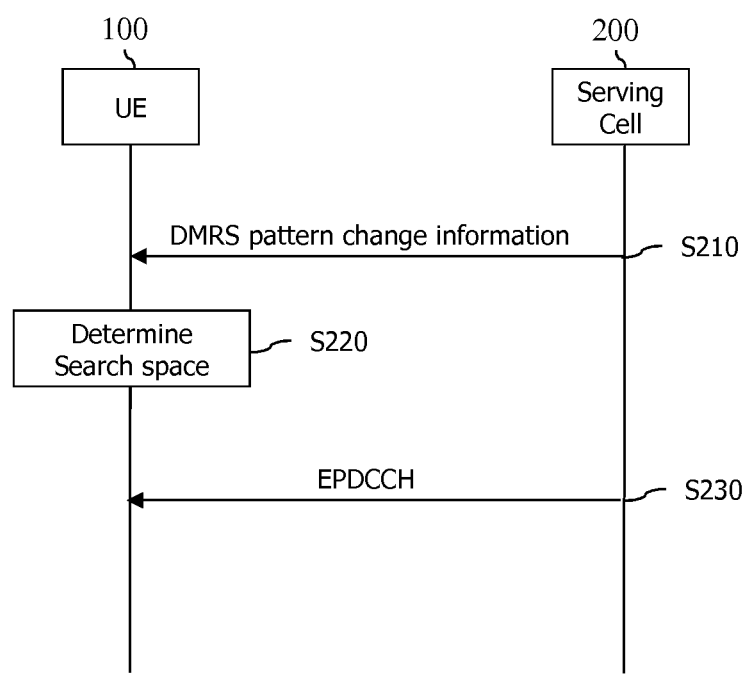
FIG. 16 is a flowchart illustrating a method for solving an imbalance between REs including a DMRS according to a second embodiment of the present specification.

FIG. 16 is a flowchart illustrating a method for solving an imbalance between REs including a DMRS according to a second embodiment of the present specification.

According to the second embodiment of the present specification, when the density of REs including DMRSs is high, a lack of REs for an EPDCCH in a corresponding RPB may cause a decrease in code rate, and thus a UE may not be allowed to use a low value of an aggregation level for an EPDCCH search space.

For example, as illustrated in FIG. 16, when a UE 100 receives DMRS pattern change information from a serving cell 200 (S210), the UE determines an EPDCCH search space (S220).

In determining the search space (S220), when the number of REs including DMRSs per PRB is greater than a predetermined number, the UE may not use a low value of an aggregation level available for an EPDCCH set including a corresponding PRB or a low value of an aggregation level for the PRB. Here, an RE including a DMRS may be an RE used for actual DMRS transmission or an RE for a reference DMRS pattern. Further, use of an aggregation level with a low value is limited when EPDCCH transmission is localized transmission. The limited aggregation level may be {1} or {1, 2}.

Limiting use of the low value of the aggregation level causes a change in the EPDCCH search space, thereby reducing the number of blind decoding times.

Meanwhile, in determining the search space (S220), when the density of REs including DMRSs is lower than a specific level, the corresponding PRB or the EPDCCH set including the PRB may not be allowed to use a high value of the aggregation level. In detail, when an aggregation level for one EPDCCH set is determined (specifically when an aggregation level for an EPDCCH set of distributed transmission is determined), the aggregation level may be determined based on a highest RE density, a lowest RE density or an average RE density.

Further, in determining the search space (S220), the UE 100 may set a DMRS pattern change or a condition for the change as a parameter and select a value of an aggregation level based on the parameter. In a system with a regular DMRS pattern, an aggregation level for an EPDCCH may have a minimum value of 1 (first case) or 2 (second case). In the first case, an aggregation with respect to the aggregation level value may be {1, 2, 4, 8, 16} or {1, 2, 4, 8}. In the second case, an aggregation with respect to the aggregation level value may be {2, 4, 8, 16, 32} or {2, 4, 8, 16}.

The second case is selected with respect to the corresponding aggregation level in the following conditions: ① when a DCI format for an EPDCCH is 2, 2A, 2B, 2C or 2D and a DL BW is 25 RB or greater, or ② when $n_{EPDCCH}$<threshold value (for instance, threshold value=104) for all DCI formats and a normal CP is used in a general subframe or a special subframe with TDD configuration 3, 4 or 8. Otherwise, the first case may be selected.

$n_{EPDCCH}$ is the number of REs in a PRB for transmission of an EPDCCH in an EPDCCH set $S_0$ and satisfies the following conditions: i) the REs are included in 16 EREGs in a PRB, ii) the REs are not used as a CRS or CSI RS, and iii) $l>l_{EPDCHHStart}$.

Meanwhile, in the future system, since a PRB in which a PSS/SSS and PBCH are transmitted is considered for transmission of an EPDCCH, a condition that iv) an RE in which a PSS/SSS/PBCH is transmitted is excluded may be added to the definition of $n_{EPDCCH}$. Further, in the future system, due to a change in the density of REs including DMRSs, the number of REs included in one EREG per PRB in each PRB or PRB set may substantially change. In this case, as described above, it may be inappropriate to select a PRB in a particular EPDCCH set to measure the number of REs. Here, a DMRS may be for actual transmission or be reserved as a reference DMRS pattern. Further, since the number of REs for each RPB may also change with respect to the same EPDCCH set, all PRBs of all EPDCCH sets for a particular UE may be considered in setting $m_{EPDCCH}$. Next, examples of setting the number of REs in a special subframe, $m_{EPDCCH}$, in a normal CP and TDD subframe settings 3, 4 and 8 are described in detail. In a first example, for the UE, the number of REs which satisfy conditions i), ii) and iii) or conditions i), ii), iii) and iv) in each PRB in EPDCCH sets is calculate. Subsequently, a minimum value among the calculated numbers of REs is set as $m_{EPDCCH}$ and is used for selecting a case of an aggregation level for an EPDCCH. The value $m_{EPDCCH}$ may be reset to be a multiple of 4. In a second example, for the UE, the number of REs which satisfy conditions i), ii) and iii) or conditions i), ii), iii) and iv) in each PRB in EPDCCH sets is calculate. Subsequently, an average value of the calculated numbers of REs is set as $m_{EPDCCH}$ and is used for selecting a case of an aggregation level for an EPDCCH. The value $m_{EPDCCH}$ may be reset to be a multiple of 4.

In the above case, a method of including an EPDCCH set in a PRB EPDCCH set $S_0$ with a minimum number of REs satisfying the above conditions in setup may be considered. Settings of a special subframe capable of supporting the second case may be changed depending on a change in the density of REs including DMRSs. For instance, when the density of REs increases, only a special subframe with TDD subframe setting 8 may be allowed. When the density of REs decreases, a setting other than subframe TDD settings 3, 4 and 8 may be added.

In condition ①, as the density of REs including DMRSs changes, the threshold value for the DL BW may also need to be reset. In condition ①, the threshold value for the DL BW may be set using bits for DCI format 2, 2A, 2B, 2C or 2D, CRC bits and the number of REs excluding DMRSs in a particular PRB in an EPDCCH set as parameters. Here, an EPDCCH set and a PRB in the EPDCCH which have low indexes or have a smallest number of REs excluding DMRSs per PRB may be selected. Alternatively, as the number of REs excluding DMRSs, an average value of the numbers of REs excluding DMRSs in all PRBs for the EPDCCH sets may be used as a parameter.

Examples of setting the threshold value for the DL BW in condition ① for the second case will be described in detail as follows.

In a first example, Z is calculated by dividing the sum of bits for DCI format 2, 2A, 2B, 2C or 2D and CRC bits by the number of REs excluding DMRSs in a PRB with a low index in an EPDCCH set $S_0$. A DL BW is selected such that Z is between X and Y, and is set as the threshold value for the DL BW in condition ①. Here, X and Y are preset values, for example, X=0.75, Y=0.85.

In a second example, a minimum value of the numbers of REs excluding DMRSs per PRB in all PRBs in all EPDCCH sets of a UE is calculated. The sum of bits for DCI format 2, 2A, 2B, 2C or 2D and CRC bits is divided by the calculated value to calculate Z. A DL BW is selected such that Z is between X and Y, and is set as the threshold value for the DL BW in condition ①. Here, X and Y are preset values, for example, X=0.75, Y=0.85.

In a third example, an average value of the numbers of REs excluding DMRSs per PRB in all PRBs in all EPDCCH sets of a UE is calculated. The sum of bits for DCI format 2, 2A, 2B, 2C or 2D and CRC bits is divided by the calculated value to calculate Z. A DL BW is selected such that Z is between X and Y, and is set as the threshold value for the DL BW in condition ①. Here, X and Y are preset values, for example, X=0.75, Y=0.85.

Meanwhile, in the future system, a CRS may be reduced and transmitted by subframe or PRB unit and also be referred to as a TRS. In this situation, a region in which a CRS (or TRS) is transmitted and a region in which the CRS is not transmitted may be present in the same EPDCCH set. Here, the number of REs for EPDCCH transmission in a PRB may vary depending on the presence of the CRS (or TRS), and thus including the CRS (or TRS) may be considered as a parameter in setting an aggregation level set. Next, examples of setting an aggregation level set for an EPDCCH depending on the presence of a CRS (or TRS) in a case where an EPDCCH set includes at least one PRS including a CRS (or TRS) are illustrated.

In a first example, an aggregation level is selected based on the number of REs available for EPDCCH transmission in a PRB including a CRS (or TRS). In a second example, an aggregation level is selected based on the number of REs available for EPDCCH transmission in a PRB including no CRS or no TRS. When all PRBs include a CRS or TRS, the first example is used. In a third example, when the number of PRBs including a CRS/TRS is greater than the number of PRBs including no CRS/TRS, the first example is used. Otherwise, the second example is used.

Setting an independent DMRS pattern by PRB or specific PRB set may increase an overhead. To prevent an overhead increase, the following methods may be considered.

In a first method, the same DMRS pattern may be used for the same EPDCCH set. Alternatively, PRBs having the same DMRS pattern may be paired in setting an EPDCCH set.

In a second method, a DMRS pattern may be set to change by subframe or slot unit, and all PRBs may have the same DMRS patterns with respect to the same subframe or slot.

In a third method, PRBs may be classified into a plurality of PRBS sets in advance, and the same DMRS pattern may be set for each PRB set. The PRB set may be represented by consecutive PRBs.

In a fourth method, even when a different DMRS pattern is used in a PRB, one DMRS pattern may be used for an EPDCCH set. One DMRS pattern may be an aggregation of DMRS patterns used in all PRBs set for the EPDCCH set. For example, when a DMRS pattern of a general subframe for antenna ports 7 to 10 and a DMRS pattern of a special subframe for antenna ports 7 to 10 are used, an aggregation of the two patterns, that is, a DMRS pattern having a 48 RE overhead, may be used.

In a fifth method, even when a different DMRS pattern is used in a PRB, one DMRS RE overhead may be used for an EPDCCH set. In this case, the DMRS RE overhead may be a largest overhead among DMRS patterns used in all PRBs set for the EPDCCH set. In each PRB, remaining REs may be filled with nulls or additional REs may fill an EPDCCH in order to adapt a maximum DMRS RE overhead. In EREG/ECCE mapping, such remaining REs may be mapped last. An easiest way for determining remaining REs is designating REs which are used as DMRS REs in a DMRS pattern having a maximum overhead but are not designated as DMRS REs in a current PRB DMRS pattern.

The embodiments of the present invention described above may be implemented by various ways and means. For example, the embodiments of the present invention may be implemented by hardware, firmware, software or combinations thereof, which will be described in detail with reference to the drawings.

Figure 17:
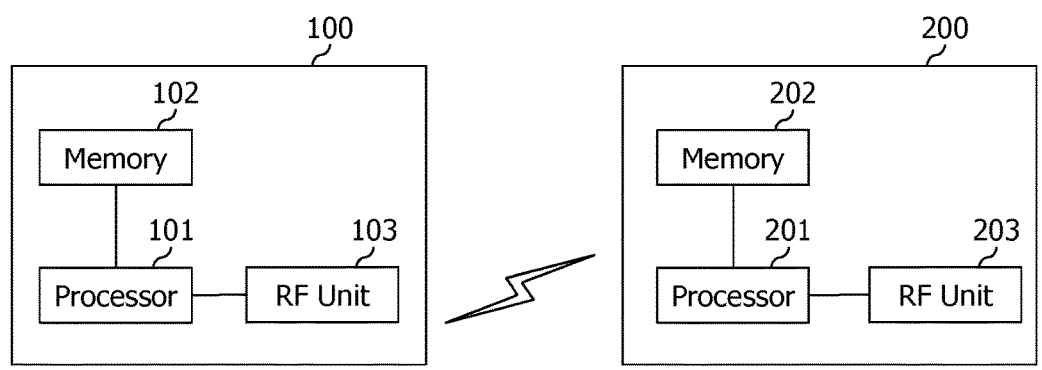
FIG. 17 is a block diagram illustrating a wireless communication system according to one embodiment of the present specification.

FIG. 17 is a block diagram illustrating a wireless communication system according to one embodiment of the present specification.

A BS 200 includes a processor 201, a memory 202 and a radio frequency (RF) unit 203. The memory 202 is connected to the processor 201 and stores various pieces of information for driving the processor 201. The RF unit 203 is connected to the processor 201 and transmits and/or receives a radio signal. The processor 201 implements proposed functions, procedures and/or methods. In the foregoing embodiments, operations of the BS may be implemented by the processor 201.

A UE 100 includes a processor 101, a memory 102 and an RF unit 103. The memory 1 is connected to the processor 101 and stores various pieces of information for driving the processor 101. The RF unit 103 is connected to the processor 101 and transmits and/or receives a radio signal. The processor 101 implements proposed functions, procedures and/or methods.

The processors may include an application-specific integrated circuit (ASIC), a separate chipset, a logic circuit and/or a data processing unit. The memory may include a read-only memory (ROM), a random access memory (RAM), a flash memory, a memory card, a storage medium and/or other storage devices. The RF units may include a base-band circuit for processing a radio signal. When the embodiments of the present invention are implemented by software, the aforementioned methods can be implemented with a module (i.e., process, function, etc.) for performing the aforementioned functions. The module may be stored in the memory and may be performed by the processors. The memories may be located inside or outside the processor, and may be coupled to the processors by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of receiving control information comprising:
   receiving information on a change in a pattern of a demodulation reference signal (DMRS);
   identifying a time at which mapping between an enhanced control channel element (ECCE) and an enhanced resource element group (EREG) for an enhanced physical downlink control channel (EPDCCH) is changed according to the change in the pattern of the DMRS; and
   receiving control information through the EPDCCH by applying the changed mapping between the ECCE and the EREG at the identified time.

2. The method of claim 1, wherein the identifying of the time at which the mapping is changed comprises:
   receiving a physical downlink control channel (PDCCH), an EPDCCH or a master information block (MIB); and
   identifying the time at which the mapping is changed through an indication comprised in the PDCCH, the EPDCCH or the MIB.

3. The method of claim 1, wherein the identifying of the time at which the mapping is changed comprises:
   receiving a PDCCH, an EPDCCH or an MIB from a primary cell or a different secondary cell when a cell in which the pattern of the DMRS is changed is a secondary cell; and
   identifying the time at which the mapping is changed through an indication comprise in the PDCCH, the EPDCCH or the MIB.

4. The method of claim 2, further comprising transmitting a positive acknowledgement (ACK) or negative acknowledgement (NACK) of the indication.

5. The method of claim 1, wherein the pattern of the DMRS is defined as a number of DMRSs comprised in each physical resource block (PRB) or subframe.

6. The method of claim 1, further comprising receiving one EPDCCH according to a plurality of DRMS patterns.

7. The method of claim 1, wherein when a number of resource elements (REs) in which the DMRS is received is greater than a predetermined threshold number per PRB, an aggregation level for a search space for the EPDCCH is adjusted.

8. The method of claim 7, wherein the aggregation level is adjusted based on a number of REs available for EPDCCH transmission in a PRB which comprises no cell-specific reference signal (CRS) or no tracking reference signal (TRS).

9. A terminal for receiving control information comprising:
   a radio frequency (RF) unit to receive information on a change in a pattern of a demodulation reference signal (DMRS); and
   a processor to identify a time at which mapping between an enhanced control channel element (ECCE) and an enhanced resource element group (EREG) for an enhanced physical downlink control channel (EPDCCH) is changed according to the change in the pattern of the DMRS, wherein the processor controls the RF unit to receive control information through the EPDCCH by applying the changed mapping between the ECCE and the EREG at the identified time.

10. The terminal of claim 9, wherein in order to identify the time at which the mapping is changed, the processor receives a physical downlink control channel (PDCCH), an EPDCCH or a master information block (MIB) through the RF unit; and identifies the time at which the mapping is changed through an indication comprised in the PDCCH, the EPDCCH or the MIB.

11. The terminal of claim 9, wherein in order to identify the time at which the mapping is changed, the processor receives a PDCCH, an EPDCCH or an MIB from a primary cell or a different secondary cell when a cell in which the pattern of the DMRS is changed is a secondary cell; and identifies the time at which the mapping is changed through an indication comprise in the PDCCH, the EPDCCH or the MIB.

12. The terminal of claim 10, wherein the processor transmits a positive acknowledgement (ACK) or negative acknowledgement (NACK) of the indication through the RF unit.

13. The terminal of claim 9, wherein the pattern of the DMRS is defined as a number of DMRSs comprised in each physical resource block (PRB) or subframe.

14. The terminal of claim 9, wherein when a number of resource elements (REs) in which the DMRS is received is greater than a predetermined threshold number per PRB, an aggregation level for a search space for the EPDCCH is adjusted.

15. The terminal of claim 14, wherein the aggregation level is adjusted based on a number of REs available for EPDCCH transmission in a PRB which comprises no cell-specific reference signal (CRS) or no tracking reference signal (TRS).

* * * * *